(12) United States Patent
Varnum et al.

(10) Patent No.: US 12,196,360 B2
(45) Date of Patent: Jan. 14, 2025

(54) FOOT ASSEMBLY WITH REVERSIBLE SPIKE

(71) Applicants: Ryan Varnum, Columbia, MO (US); Timothy S. Kinney, Warrenton, MO (US); Seth Wheeler, Columbia, MO (US); Aaron Wood, Columbia, MO (US); Todd Strobel, Columbia, MO (US); James Tayon, Moberly, MO (US); Kyle Martin, Columbia, MO (US); Michael Cottrell, Ashland, MO (US); Brian Steere, Columbia, MO (US); Tim Meissen, Columbia, MO (US); Brett Eckelkamp, Fulton, MO (US); Jason Nickerson, Columbia, MO (US); Matthew Kinamore, Columbia, MO (US)

(72) Inventors: Ryan Varnum, Columbia, MO (US); Timothy S. Kinney, Warrenton, MO (US); Seth Wheeler, Columbia, MO (US); Aaron Wood, Columbia, MO (US); Todd Strobel, Columbia, MO (US); James Tayon, Moberly, MO (US); Kyle Martin, Columbia, MO (US); Michael Cottrell, Ashland, MO (US); Brian Steere, Columbia, MO (US); Tim Meissen, Columbia, MO (US); Brett Eckelkamp, Fulton, MO (US); Jason Nickerson, Columbia, MO (US); Matthew Kinamore, Columbia, MO (US)

(73) Assignee: AOB Products Company, Columbia, MO (US)

(*) Notice: Subject to any disclaimer, the term of this patent is extended or adjusted under 35 U.S.C. 154(b) by 0 days.

(21) Appl. No.: 18/053,048

(22) Filed: Nov. 7, 2022

(65) Prior Publication Data
US 2023/0175642 A1 Jun. 8, 2023

Related U.S. Application Data

(60) Provisional application No. 63/264,392, filed on Nov. 22, 2021, provisional application No. 63/263,604, filed on Nov. 5, 2021.

(51) Int. Cl.
*F16M 11/36* (2006.01)
(52) U.S. Cl.
CPC ................................. *F16M 11/36* (2013.01)
(58) Field of Classification Search
CPC ...................................................... F16M 11/36
(Continued)

(56) References Cited

U.S. PATENT DOCUMENTS

| 1,088,606 | A | * | 2/1914 | McGinley | ............... | A61L 2/20 |
| | | | | | | 422/305 |
| 1,175,352 | A | | 3/1916 | Hand | | |

(Continued)

OTHER PUBLICATIONS

U.S. Pat. No. 2,982,56, May 6, 1884, Vail. Not able to insert 6-digit U.S. in U.S. Patent Literature.

(Continued)

*Primary Examiner* — Muhammad Ijaz
(74) *Attorney, Agent, or Firm* — Stinson LLP

(57) ABSTRACT

A foot assembly for a leg of an equipment support, components thereof, and associated methods. The foot assembly includes a spike selectively configurable in a stowed orientation and in a deployed orientation.

34 Claims, 6 Drawing Sheets

(58) Field of Classification Search
USPC .................. 248/188.8, 188.9, 677, 673, 545
See application file for complete search history.

(56) References Cited

U.S. PATENT DOCUMENTS

| | | | |
|---|---|---|---|
| 1,650,747 A | 11/1927 | Thalhammer | |
| 1,863,761 A | 6/1932 | Neuwirth | |
| 1,883,276 A | 10/1932 | Zerk | |
| 2,282,285 A | 5/1942 | Olson | |
| 2,283,422 A | 5/1942 | Chamberlain, Jr. | |
| 2,550,550 A | 4/1951 | Goodstein | |
| 2,612,335 A | 9/1952 | Saltzman | |
| 4,096,896 A | 6/1978 | Engel | |
| 4,131,122 A | 12/1978 | Brooks | |
| 4,407,505 A * | 10/1983 | Kendziorski | A63B 57/357 |
| | | | 473/492 |
| 4,535,658 A | 8/1985 | Molinari | |
| 4,658,534 A | 4/1987 | McLean | |
| 4,969,599 A * | 11/1990 | Campbell | A01M 31/008 |
| | | | 239/57 |
| 5,335,409 A | 8/1994 | Elvebak | |
| 5,655,317 A * | 8/1997 | Grant | A43D 100/14 |
| | | | 36/134 |
| 6,216,713 B1 | 4/2001 | Kennan | |
| 6,418,952 B1 | 7/2002 | Worley et al. | |
| 6,564,489 B1 * | 5/2003 | Bader | G09F 15/00 |
| | | | 116/63 P |
| 6,568,658 B2 | 5/2003 | Strome | |
| 6,863,352 B2 | 3/2005 | Sollami | |
| 7,222,827 B2 | 5/2007 | Crain et al. | |
| 8,020,832 B2 | 9/2011 | Chang | |
| 8,047,498 B1 * | 11/2011 | Karty | F16M 11/36 |
| | | | 248/156 |
| 8,528,868 B2 | 9/2013 | Leung | |
| 8,739,807 B2 | 6/2014 | Taylor et al. | |
| 9,393,472 B2 | 7/2016 | Nagi | |
| D770,557 S | 11/2016 | Johnson et al. | |
| 9,494,276 B2 | 11/2016 | Johnson et al. | |
| 9,675,146 B1 | 6/2017 | Howell | |
| 9,689,525 B1 | 6/2017 | Johnson, Sr. et al. | |
| 9,816,662 B2 | 11/2017 | Johnson, Sr. et al. | |
| D815,679 S | 4/2018 | Johnson et al. | |
| 10,054,256 B2 | 8/2018 | Johnson, Sr. et al. | |
| 10,247,353 B1 | 4/2019 | Chen | |
| 10,267,452 B2 | 4/2019 | Johnson, Sr. et al. | |
| 10,359,147 B1 | 7/2019 | Johnson, Sr. | |
| 10,473,261 B2 | 11/2019 | Johnson, Sr. | |
| 10,663,107 B2 | 5/2020 | Johnson, Sr. | |
| 11,761,575 B1 * | 9/2023 | Stabler | F16M 11/247 |
| | | | 248/156 |
| 2017/0074451 A1 | 3/2017 | Sharp | |
| 2019/0390819 A1 | 12/2019 | Underwood | |

OTHER PUBLICATIONS

U.S. Pat. No. 4,441,89, Jan. 6, 1891, Wildhack. Not able to insert 6-digit U.S. Patent in U.S. Patent Literature.

* cited by examiner

FOOT ASSEMBLY WITH REVERSIBLE SPIKE

CROSS-REFERENCE TO RELATED APPLICATIONS

The present application claims priority to U.S. Provisional Application No. 63/264,392, filed Nov. 22, 2021, and to U.S. Provisional Application No. 63/263,604, filed Nov. 5, 2021, the entireties of which are hereby incorporated by reference.

FIELD

The present disclosure generally relates to equipment supports, and more particularly to stands such as bipods, tripods, etc., for supporting equipment such as weapons, optics, cameras, or other equipment.

BACKGROUND

Bipods, tripods, and other types of equipment stands are used to support various types of equipment. For example, hunters may use such stands to support an optic (e.g., spotting scope), a weapon (e.g., rifle), or a camera. Such equipment supports are also used in other areas.

SUMMARY

In one aspect, a foot assembly for a leg of an equipment support comprises a foot and an elongate spike. The foot has a distal surface and defines a bore extending proximally from the distal surface. The bore has a proximal end and a distal end. The elongate spike has opposite first and second ends. The spike includes a tip defining the first end. The second end is a free end. The spike is securable in a deployed configuration and a stowed configuration relative to the foot. In the deployed configuration, the spike is disposed in the bore of the foot, the first end of the spike is disposed distal of the distal surface of the foot, and the first end of the spike is disposed distal of the second end of the spike. In the stowed configuration, the spike is disposed in the bore of the foot, the second end of the spike is at the distal end of the bore or is disposed proximal of the distal end of the bore, and the second end of the spike is disposed distal of the first end of the spike.

In another aspect, a foot assembly for a leg of an equipment support comprises a base assembly and an elongate spike. The base assembly is configured to be attached to the leg of the equipment support. The base assembly includes a foot. The elongate spike has a tip at one end. The spike includes a first retainer and a second retainer. The spike is releasably securable to the base assembly in a deployed configuration and a stowed configuration. In the deployed configuration the tip of the spike is exposed to permit the tip to be driven into ground and the first retainer is engaged with the base assembly to retain the spike in the deployed configuration. In the stowed configuration the tip of the spike is stowed and the second retainer is engaged with the base assembly to retain the spike in the stowed configuration.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
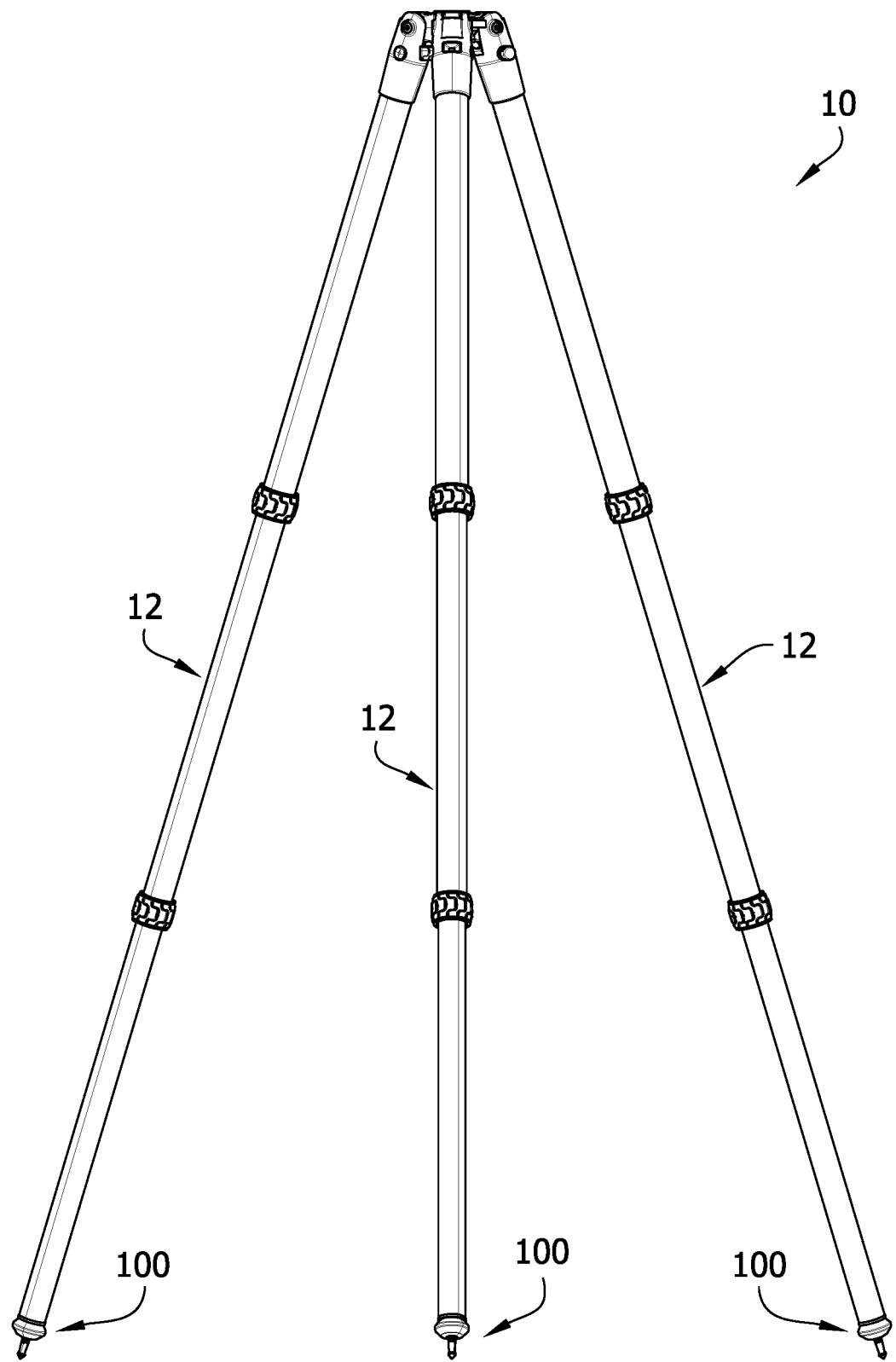
FIG. 1 is a perspective of an equipment support of the present disclosure.
Figure 2:
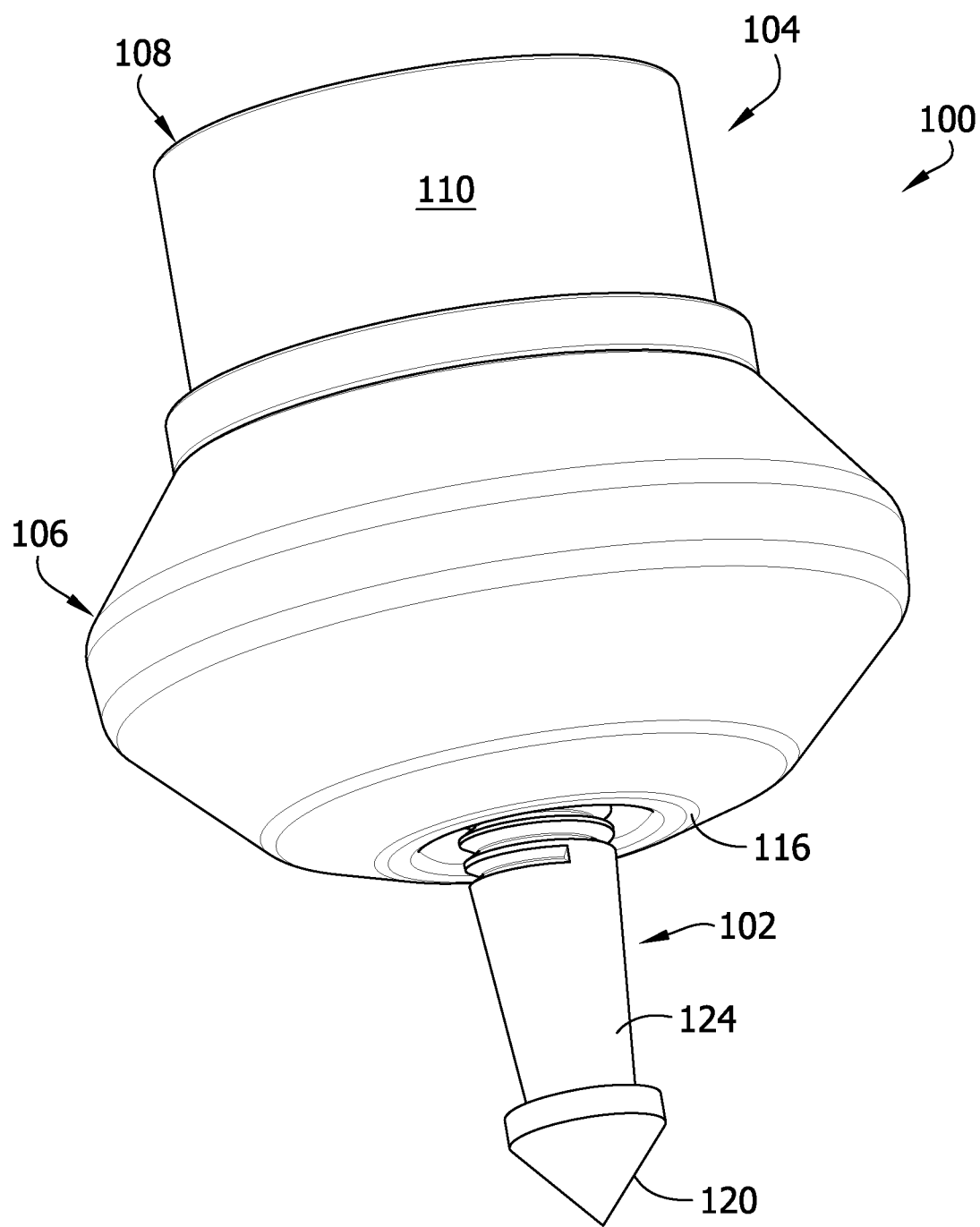
FIG. 2 is a perspective of a foot assembly of the present disclosure, with a spike of the foot assembly in a deployed configuration.
Figure 3:
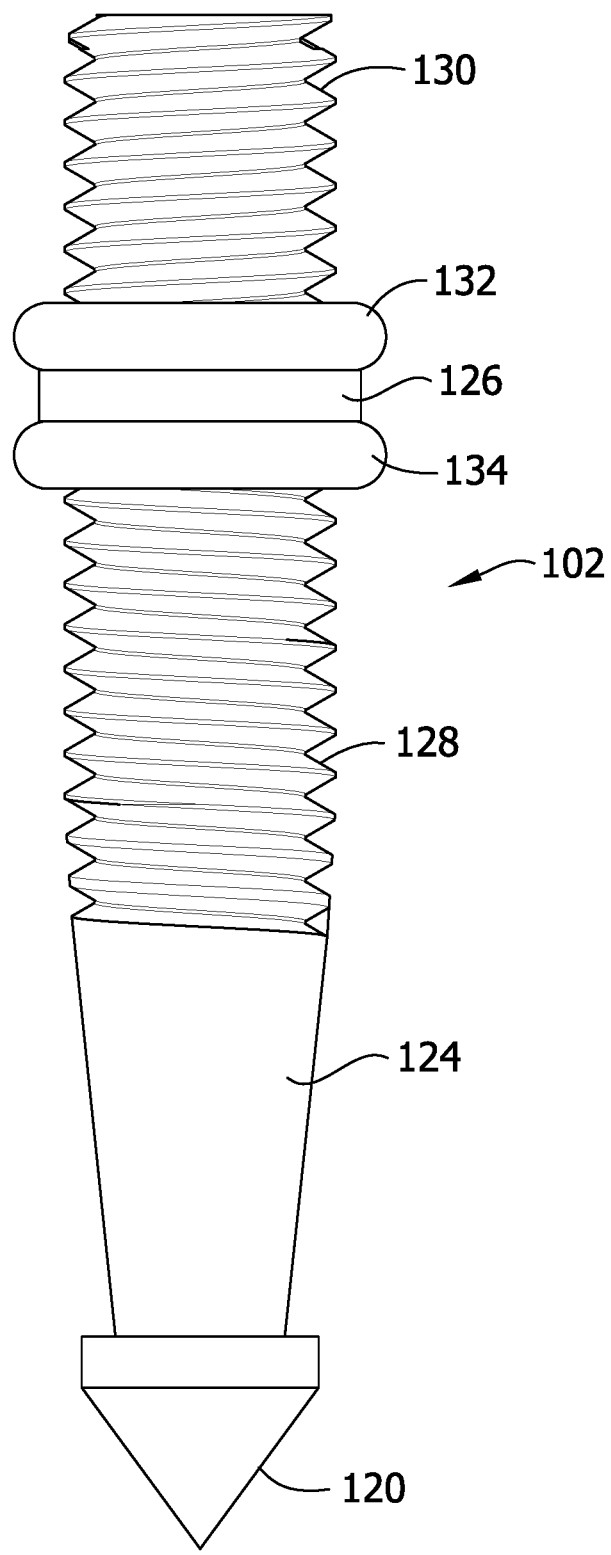
FIG. 3 is a front elevation of the spike.
Figure 4:
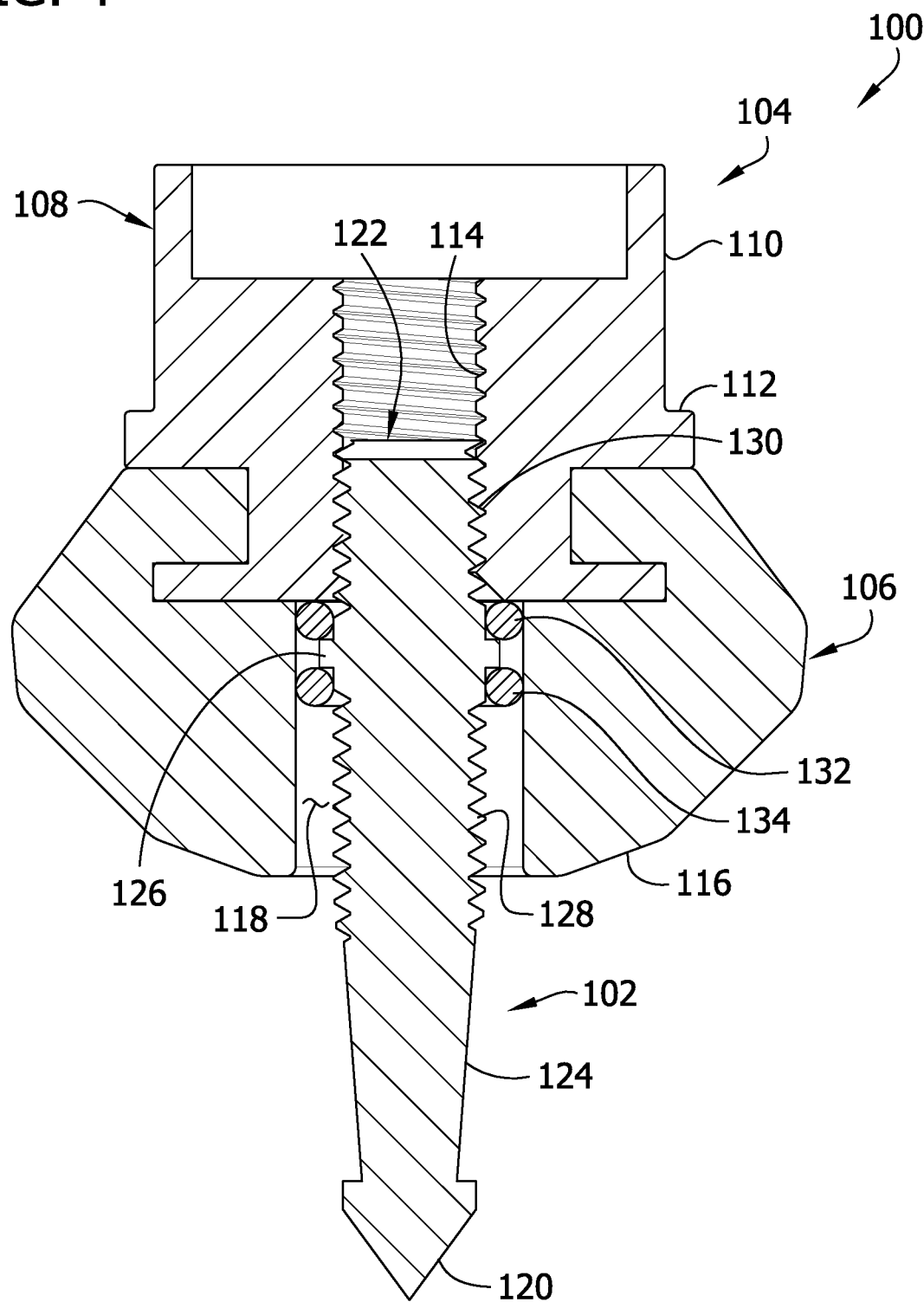
FIG. 4 is a cross-section of the foot assembly with the spike in the deployed configuration.

Referring to FIG. 1, an equipment support (e.g., multi-legged equipment support) of the present disclosure is generally indicated by reference numeral 10. The equipment support 10 can be used to support a variety of objects, such as cameras, optics, and/or weapons (e.g., firearm), collectively referred to hereafter as equipment. Typically, the equipment support 10 includes a head or mount (not shown), at the top thereof, for connecting to and/or supporting the equipment. In the illustrated embodiment, the equipment support 10 comprises a tripod having three legs 12, but it will be understood that equipment supports having other numbers of legs (e.g., one, two, four, etc.) can be used without departing from the scope of the present disclosure. The lower end of each leg 12 includes a foot assembly (or, in particular, a reversible spike system or assembly) of the present disclosure, generally indicated by reference numeral 100. The foot assemblies 100 engage a support surface, such as a floor, the ground, etc., on which the equipment support 10 stands. It is understood the foot assembly 100 of the present disclosure can be incorporated into other devices, besides equipment supports, which engage or stand on a support surface, and the foot assembly can have other configurations, without departing from the scope of the present disclosure.

Referring to FIGS. 2-6, the foot assembly 100 includes a spike 102 and a base assembly 104. In the illustrated embodiment, the base assembly 104 includes a foot 106 and a foot base 108. The foot base 108 (broadly, the base assembly 104) is configured to be attached to the leg 12 of the equipment support 12. In the illustrated embodiment, the foot base 108 comprises a plug that is secured to the leg 12. The foot base 108 includes a leg insertion portion 110 that fits into an opening in the leg 12 and a shoulder 112 that engages the end of the leg. Typically, the leg 12 will be cylindrical with a hollow opening the leg insertion portion 110 fits into. The foot base 108 includes a threaded (e.g., internally threaded) opening 114. The foot base 108 can comprise any suitable material, such as metal, plastic, and the like. The foot 106 is coupled to the foot base 108. The foot 106 includes a proximal end portion and a distal end portion. The proximal end portion of the foot 106 is attached to the foot base 108. In the illustrated embodiment, the foot base 108 includes a channel and flange which mates with a flange and channel, respectively, of the foot 106 to attach the foot to the foot base. Other ways, such as adhesives, fasteners, etc., of attaching the foot to the foot base are within the scope of the present disclosure.

The distal or lower end portion of the foot 106 has a generally hemispherical shape, although other shapes are within the scope of the present disclosure. In the illustrated embodiment, the foot 106 tapers outward from foot base 108 to the hemispherically shaped lower end. The hemishpherically shaped portion of the foot 106 is arranged to engage or rest on the support surface the equipment support 12 is placed on. The distal end portion of the foot 106 includes a distal surface 116. The distal surface 116 has a generally hemispherical shape, although other shapes are within the scope of the present disclosure. The foot 106 includes a bore 118 having a proximal end and a distal end. The distal end of the bore 118 is at the distal surface 116. The bore 118 extends proximally from the distal surface 116. The bore 118 and the threaded opening 114 are aligned with one another. In the illustrated embodiment, the bore 118 extends proximally to the threaded opening 114. The foot 106 can comprise any suitable material such as rubber, plastic, metal, and the like.

The spike 102 of the foot assembly is elongate, with opposite first and second end. The spike 102 includes a tip or barb 120 at the first end. The tip 120 is configured to be driven into the support surface (e.g., ground). The second end of the spike 102 is a free end. In the illustrated embodiment, the spike 102 includes a tool receiver 122, which defines the second end. The tool receiver 122 is sized and shaped to receiver a tool, for reasons that will become apparent. In the illustrated embodiment, the tool receiver 122 is a groove or channel sized and shaped to receiver a flat head screwdriver, although other configurations of the tool receiver are within the scope of the present disclosure. For example, the tool receiver can be configured to receiver a finger nail, a coin, a knife, a Philips head screwdriver, etc. The spike 102 is generally cylindrical. The spike 102 includes a shaft 124 generally extending between the tip 120 and the tool receiver 122. The spike 102 includes a stop 126 at an intermediate position along the spike between the first and second ends. In the illustrated embodiment, the stop 126 comprises a circumferential flange extending radially outward from the shaft 124.

The stop 126 generally divides the spike 102 into two portions, a ground portion and a stud portion. The ground portion extends from the stop 126 to the tip 120 and the stud portion extends, in the opposite direction, from the stop to the tool receiver 122. The ground portion is longer than the stud portion, for reasons that will become apparent. The ground portion includes a first threaded portion 128 of the spike 102 and the stud portion includes a second threaded portion 130 of the spike. The first threaded portion 128 is disposed on one side of the stop 126 and the second threaded portion 128 is disposed on an opposite side of the stop. Both threaded portions 128, 130 can be threaded into the threaded opening 114 of the foot base 108.

As shown in the figures, the spike 102 is securable in a deployed configuration or position (FIGS. 2 and 4) and a stowed configuration or position (FIGS. 5 and 6) relative to the foot 106. In the deployed configuration, the spike 102 is exposed and extends generally downward so that the spike can rest on and/or be driven into the support surface. The tip 120 of the spike 102 is exposed to permit the tip to be driven into the support surface. In this position, the spike 102 is releasably secured to the foot base 108 (broadly, the base assembly 104). In the illustrated embodiment, the spike 102 is threadably secured to the foot base 108. The second threaded portion 130 is threadably disposed in the threaded opening 114. The spike 102 is disposed in the threaded opening and in the bore 118. The first end or tip 120 of the spike 102 is disposed distal of the distal surface 116 of the foot 106. And the first end of the spike 102 is disposed distal of the second end of the spike.

Figure 5:
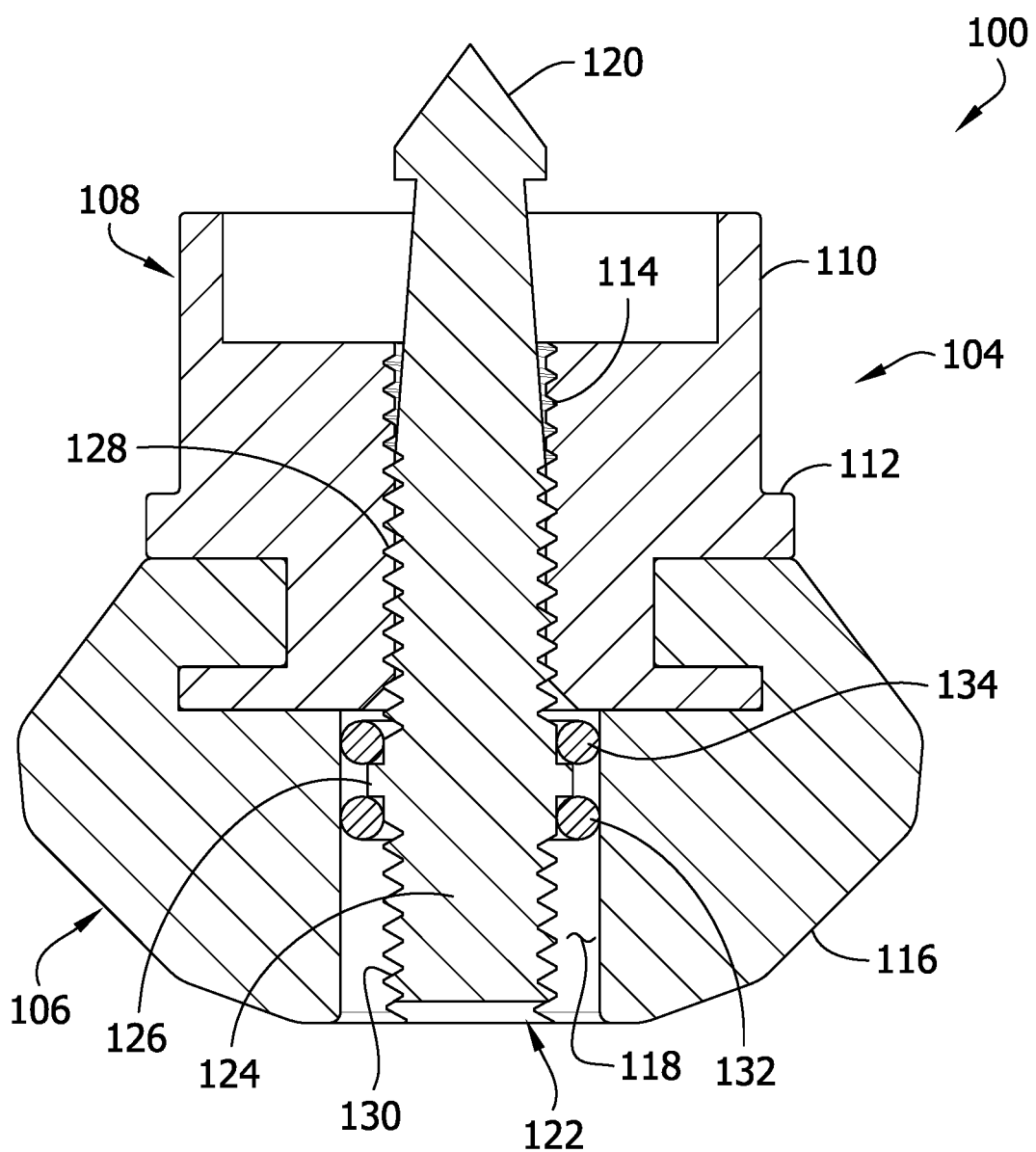
FIG. 5 is a cross-section of the foot assembly with the spike in a stowed configuration.
Figure 6:
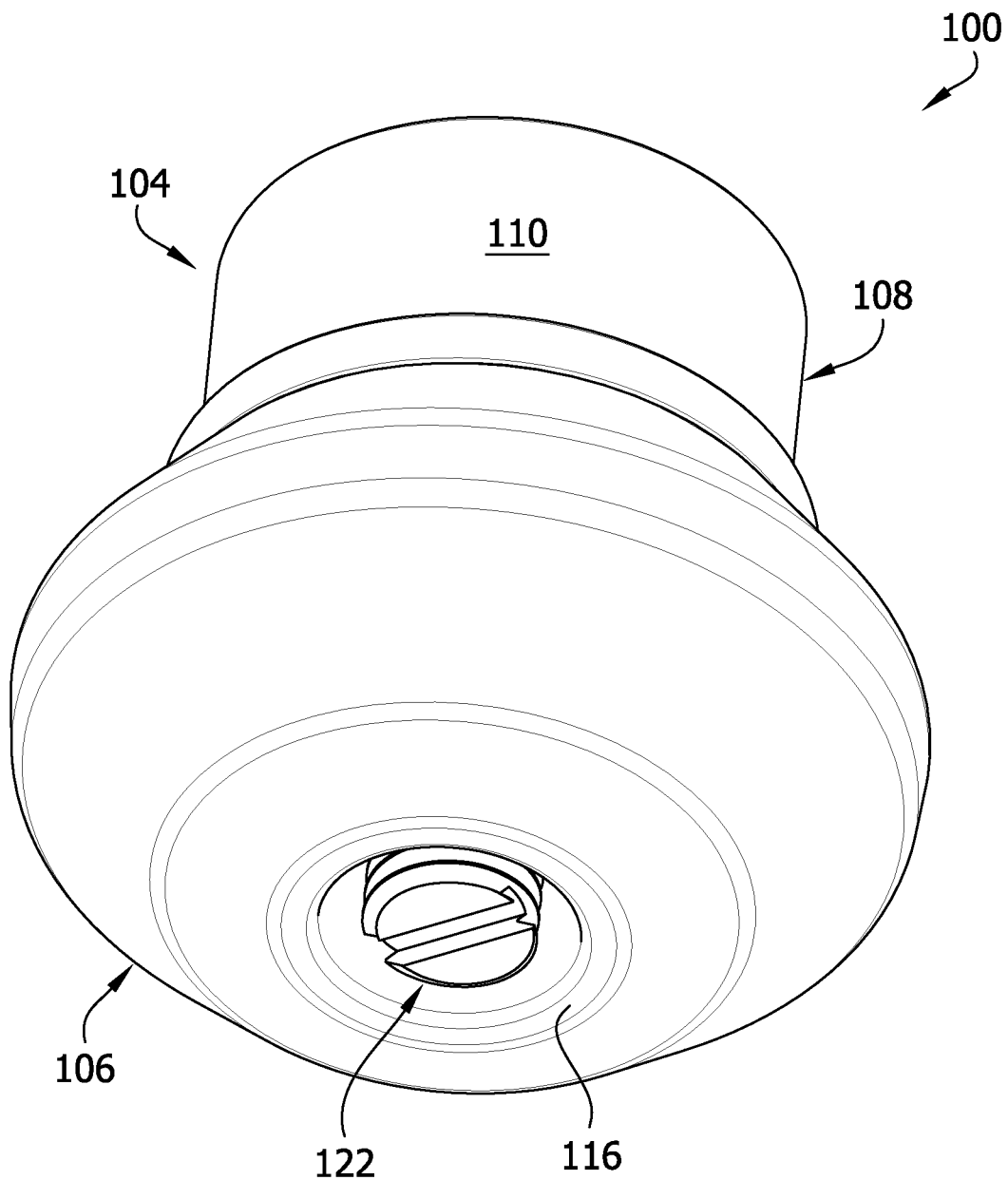
FIG. 6 is a cross-section of the foot assembly with the spike in the stowed configuration.

In the stowed configuration, the spike 102 (e.g., the tip 120) is stowed, such that the spike cannot be driven into the ground and it out of the way so that the foot 106 (specifically, the distal surface 116 thereof) can rest on the support surface. The tip 120 of the spike 102 is not exposed so that the tip of the spike cannot come into contact with the support surface. In this position, the spike 102 is releasably secured to the foot base 108 (broadly, the base assembly 104). In the illustrated embodiment, the spike 102 is threadably secured to the foot base 108. The first threaded portion 128 is threadably disposed in the threaded opening 114. Thus, as shown in FIGS. 5 and 6, the spike 102 is generally flipped over from its position in the deployed configuration. The spike 102 is disposed in the threaded opening and in the bore 118. The second end of the spike 102 is desirably at the distal end of the bore 118 or is disposed proximal of the distal end of the bore. Desirably, the tool receiver 122 is recessed in the foot 106. And the second end of the spike 102 is disposed distal of the first end of the spike. In this position, the spike 102 may extend through the foot base 108 and into the hollow opening of the leg 12. In the stowed position, the distal surface 116 of the foot 106 is arranged to engage the support surface. The spike 102 (broadly, the foot assembly 100) is configured such that it is the distal surface 116 of the foot 106 that will engage and rest on the support surface.

Still referring to FIGS. 2-6, the foot assembly 100 includes at least one retainer arranged to secure the spike 102 in at least one the deployed configuration and/or the stowed configuration. In the illustrated embodiment, the foot assembly 100 includes a first retainer 132 and a second retainer 134. The first retainer 132 is arranged to secure the spike 102 in the deployed configuration. In other words, the first retainer 132 inhibits the spike 102 from moving out of the deployed configuration. The second retainer 134 is arranged to secure the spike 102 in the stowed configuration. In other words, the second retainer 134 inhibits the spike 102 from moving out of the stowed configuration. In the illustrated embodiment, the first and second retainers 132, 234 are mounted on the spike 102 (generally, the spike includes the first and second retainers). The first retainer 132 is disposed on one side of the stop 126 and the second retainer 134 is disposed on an opposite side of the stop. Specifically, in the illustrated embodiment, the stop 126 is disposed between the first and second retainers 132, 134 and is arranged to brace the first and second retainers. The first retainer 132 abuts against one side surface of the stop 126 and the second retainer 134 abuts against the other side surface of the stop. In one embodiment, the first and second retainers 132, 134 each comprise a resiliently compressible material, such as rubber, silicone, or the like. In one embodiment, the first and second retainers 132, 134 each comprise an O-ring. In the illustrated embodiment, first and second retainer 132, 134 extend outward (e.g., radially outward) of the stop 126, such that the out diameters of the first and second retainers is larger than the outer diameter of the stop (broadly, an outer diameter of the body of the spike 102). In other embodiments, the stop may extend radially outward of the first and second retainers. In one embodiment, the spike 102 may define a circumferential groove or channel (not shown) adjacent each side of the stop 126, with the first and second retainers disposed in one of the circumferential grooves. However, in the illustrated embodiment, the spike 102 does not include the circumferential grooves.

In the deployed configuration, the first retainer 132 engages the base assembly 104 (specifically, the foot base 108) to retain the spike 102 in the deployed configuration. The first retainer 132 is resiliently compressed between the stop 126 and the foot base 108, creating an interference that inhibits the spike 102 from inadvertently withdrawing from (e.g., rotating relative to) the foot base. In the stowed configuration, the second retainer 134 engages the base assembly 104 (specifically, the foot base 108) to retain the spike 102 in the deployed configuration. The second retainer 134 is resiliently compressed between the stop 126 and the foot base 108, creating an interference that inhibits the spike 102 from inadvertently withdrawing from (e.g., rotating relative to) the foot base.

To move the spike 102 from the deployed configuration (FIGS. 2 and 4) to the stowed configuration (FIGS. 5 and 6), first the user or operator disconnects the spike 102 from the base assembly 104. The user rotates the spike to unthread the second threaded portion 130 from the threaded opening 114 of the foot base 108. The user can manually grasp the exposed portion of the spike 102 to rotate it and applies enough force to overcome the interference of the first retainer 132 holding the spike in the deployed configuration. After the spike 102 is disconnected from the foot base 108, the user removes the spike from the base assembly 104 (by moving the spike distally), flips it over or turns it around, and then reconnects the spike to the base assembly 104. The user re-inserts the spike, tip 120 first, into the base assembly 104, moving the spike 102 proximally into the bore 118 and the threaded opening 114. The user then rotates the spike 102 to thread the first threaded portion 128 into the threaded opening 114 of the foot base 108. The spike 102 is rotated until the second retainer 134 is compressed between the stop 126 and the foot base 108, thereby preventing any further rotation of the spike and holding the spike in the stowed configuration. The user may use a tool, such as a screw driver, engaged with the tool receiver 120 to rotate the spike and thread the first threaded portion 128 into the threaded opening 114. The process is generally repeated in reverse to move the spike 102 from the stowed configuration to the deployed configuration. In the stowed configuration, the user disconnects the spike 102 from the base 104. The user rotates the spike 102, either manually if able or with a tool engaged with the tool receiver 120, to unthread the first threaded portion 128 from the threaded opening 114 of the foot base 108. The user applies enough force to overcome the interference of the second retainer 134 holding the spike 102 in the stowed configuration. After the spike 102 is disconnected from the foot base 108, the user removes the spike from the base assembly 104 (by moving the spike distally), flips it over or turns it around, and then reconnects the spike to the base assembly 104. The user re-inserts the spike 102, tool receiver 120 first, into the base assembly 104, moving the spike 102 proximally into the bore 118 and the threaded opening 114. The user then rotates the spike 102 to thread the second threaded portion 130 into the threaded opening 114 of the foot base 108. The spike 102 is rotated until the first retainer 132 is compressed between the stop 126 and the foot base 108, thereby preventing any further rotation of the spike and holding the spike in the deployed configuration.

It will be apparent that modifications and variations are possible without departing from the scope of the disclosure defined in the appended claims.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products without departing from the scope of the claims, it is intended that all matter contained in the above description and shown in the accompanying drawings shall be interpreted as illustrative and not in a limiting sense.

What is claimed is:

1. A foot assembly for a leg of an equipment support, the foot assembly comprising:
    a foot having an exterior distal surface for supporting the foot on a support surface, the foot defining a bore extending proximally from the distal surface, the bore having a proximal end and a distal end; and
    an elongate spike having opposite first and second ends, the spike including a tip defining the first end, the second end being a free end, the spike securable in a deployed configuration and a stowed configuration relative to the foot, wherein in the deployed configuration:
        the spike is disposed in the bore of the foot,
        the first end of the spike is disposed distal of the distal surface of the foot, and
        the first end of the spike is disposed distal of the second end of the spike, and
    wherein in the stowed configuration:
        the spike is disposed in the bore of the foot,
        the second end of the spike is at the distal end of the bore or is disposed proximal of the distal end of the bore; and
        the second end of the spike is disposed distal of the first end of the spike;
    wherein the spike is sized and shaped relative to the distal end of the bore to permit the spike to move distally through the distal end of the bore from the deployed configuration to change the configuration of the spike from the deployed configuration to the stowed configuration.

2. The foot assembly of claim 1, further comprising a foot base coupled to the foot.

3. The foot assembly of claim 2, wherein the spike is releasably secured to the foot base in the deployed configuration.

4. The foot assembly of claim 3, wherein the spike is releasably secured to the foot base in the stowed configuration.

5. The foot assembly of claim 4, wherein the spike is configured to threadably connect to the foot base in the deployed and stowed configurations.

6. The foot assembly of claim 2, wherein the foot base is configured to be attached to the leg of the equipment support.

7. The foot assembly of claim 1, further comprising a retainer arranged to secure the spike in at least one of the deployed configuration or the stowed configuration.

8. The foot assembly of claim 1, further comprising a first retainer arranged to secure the spike in the deployed configuration and a second retainer arranged to secure the spike in the stowed configuration.

9. The foot assembly of claim 8, wherein the first and second retainers are mounted on the spike.

10. The foot assembly of claim 9, wherein the spike includes a stop at an intermediate position along the spike between the first and second ends, the first retainer disposed on one side of the stop and the second retainer disposed on an opposite side of the stop.

11. The foot assembly of claim 10, further comprising a base assembly including the foot and a foot base coupled to the foot, the foot base configured to be attached to the leg of the equipment support, the spike being releasably secured to the foot base in the deployed configuration and in the stowed configuration.

12. The foot assembly of claim 11, wherein the first retainer contacts the base assembly in the deployed configuration and the second retainer contacts the base assembly in the stowed configuration.

13. The foot assembly of claim 12, wherein the foot base includes a threaded opening aligned with the bore and the spike includes a first threaded portion disposed on said one side of the stop and a second threaded portion disposed on said opposite side of the stop, the first threaded portion configured to be threadably disposed in the threaded opening when the spike is in the stowed configuration and the second threaded portion configured to be threadably disposed in the threaded opening when the spike is in the deployed configuration.

14. The foot assembly of claim 8, wherein the first and second retainers each comprise a resiliently compressible material.

15. The foot assembly of claim 8, wherein the first and second retainers each comprise an O-ring.

16. The foot assembly of claim 1, wherein the spike includes a tool receiver defining the second end of the spike, the tool receiver sized and shaped to receive a tool.

17. The foot assembly of claim 1, wherein the distal surface is arranged to contact the support surface when the spike is in the stowed configuration.

18. The foot assembly of claim 1, in combination with the equipment support.

19. The foot assembly of claim 1, wherein the spike is sized and shaped relative to the distal end of the bore to permit the spike to move distally through the distal end of the bore from the stowed configuration to change the configuration of the spike from the stowed configuration to the deployed configuration.

20. The foot assembly of claim 19, wherein a diameter of the bore at the distal end of the bore is greater than a largest diameter of the spike.

21. A foot assembly for a leg of an equipment support, the foot assembly comprising:
 a base assembly configured to be attached to the leg of the equipment support, the base assembly including a foot; and
 an elongate spike having a body including a tip, the spike including a first retainer and a second retainer, the spike releasably securable to the base assembly in a deployed configuration and a stowed configuration, wherein in the deployed configuration the tip of the spike is exposed to permit the tip to be driven into ground and the first retainer is in contact with the base assembly to retain the spike in the deployed configuration, and wherein in the stowed configuration the tip of the spike is stowed and the second retainer is in contact with the base assembly to retain the spike in the stowed configuration, the first and second retainers being carried by the body of the spike and movable with the body of the spike between the deployed and stowed configurations.

22. The foot assembly of claim 21, wherein the spike includes a stop disposed between and arranged to brace the first and second retainers.

23. The foot assembly of claim 21, wherein the base assembly includes a contact surface, wherein in the deployed configuration the first retainer is in contact with the contact surface of the base assembly to retain the spike in the deployed configuration and the second retainer is not in contact with the contact surface of the base assembly, and wherein in the stowed configuration the second retainer is in contact with the contact surface of the base assembly to retain the spike in the stowed configuration and the first retainer is not in contact with the contact surface of the base assembly.

24. The foot assembly of claim 23, wherein in the deployed configuration the tip of the spike points in a first direction, and wherein the contact surface faces in the first direction.

25. The foot assembly of claim 21, wherein the first and second retainers are each resiliently compressible.

26. The foot assembly of claim 21, wherein the spike and the base assembly are arranged relative to one another such that the spike is movable between the deployed and stowed configurations without disconnecting the foot from a remainder of the base assembly.

27. The foot assembly of claim 21, wherein the spike includes a first connector and a second connector, the first and second connectors configured to connect to the base assembly, wherein in the deployed configuration the first connector is connected to the base assembly, and wherein in the stowed configuration the second connector is connected to the base assembly.

28. The foot assembly of claim 27, wherein the first and second connectors each comprise threading.

29. A foot assembly for a leg of an equipment support configured to be supported by a ground surface, the foot assembly comprising:
 a base assembly configured to be attached to the leg of the equipment support, the base assembly including a foot; and
 an elongate spike including a tip, the spike including a first connector and a second connector, the spike releasably connectable to the base assembly in a deployed configuration and a stowed configuration, wherein in the deployed configuration the tip of the spike is exposed to permit the tip to be driven into the ground surface and the first connector connects the spike to the base assembly, and wherein in the stowed configuration the tip of the spike is not arranged to be driven into the ground and the second connector connects the spike to the base assembly;
 wherein the foot is configured to contact the ground surface when the spike is in the stowed configuration, and wherein the foot is configured to contact the ground when the spike is in the deployed configuration and the tip of the spike is driven into the ground surface.

30. The foot assembly of claim 29, wherein the first and second connectors each comprise threading, the threading of the first connector threadably connecting the spike to the base assembly when the spike is in the deployed configuration and the threading of the second connector threadably connecting the spike to the base assembly when the spike is in the stowed configuration.

31. The foot assembly of claim 29, wherein in the deployed configuration the spike is arranged to protrude from the foot, and wherein in the stowed configuration the spike is arranged relative to the foot such that the spike does not protrude from the foot.

32. The foot assembly of claim 29, wherein the spike includes a stop disposed between the first and second connectors.

33. The foot assembly of claim 29, further comprising at least one retainer arranged to secure the spike in at least one of the deployed configuration or the stowed configuration.

34. The foot assembly of claim 29, wherein the spike and the base assembly are arranged relative to one another such that the spike is movable between the deployed and stowed configurations without disconnecting the foot from a remainder of the base assembly.

\* \* \* \* \*